July 1, 1924.
H. G. SIBBALD
RECEPTACLE
Filed July 30, 1923
1,500,007
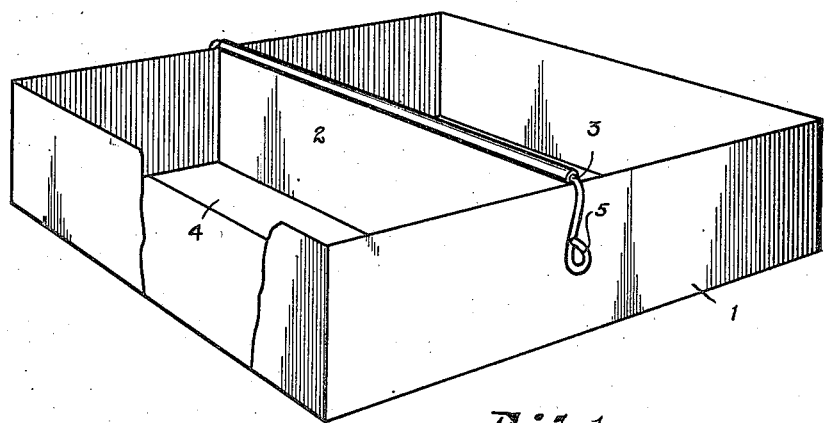
Fig. 1.
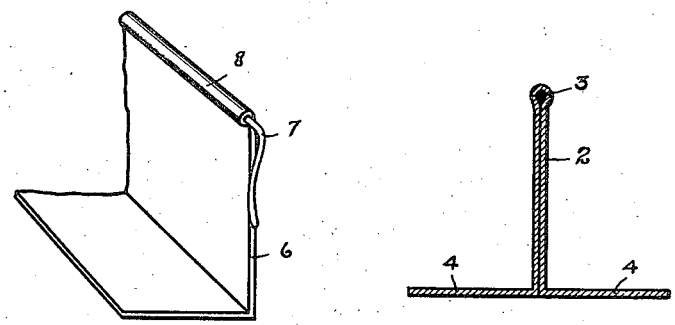
Fig. 3.
Fig. 2.
Inventor
Henrietta G. Sibbald.
By Geo. Stevens,
Attorney Patented July 1, 1924.

1,500,007

UNITED STATES PATENT OFFICE.

HENRIETTA G. SIBBALD, OF DULUTH, MINNESOTA.

RECEPTACLE.

Application filed July 30, 1923. Serial No. 654,538.

*To all whom it may concern:*

Be it known that I, HENRIETTA G. SIBBALD, a citizen of the United States, residing at Duluth, in the county of St. Louis and State of Minnesota, have invented certain new and useful Improvements in Receptacles, of which the following is a specification, reference being had therein to the accompanying drawing.

This invention relates to receptacles and has special reference to means for dividing the internal area of a baking or like receptacles so that thin cake batters of different colors may be kept from running into one another.

The principal object of the invention is to provide convenient means whereby two or more cakes, for example, may be baked within a single receptacle, they being of any desired variation in size.

Another object is to provide such means applicable to a pan or receptacle without in any way changing the design or interfering with the usefulness of the receptacle.

Other objects and advantages of the invention will appear in the further description thereof.

Referring to the accompanying drawing forming part of this application and in which like reference characters indicate like parts;

Figure 1 is a perspective view of a bake pan equipped with one of the improved division elements;

Figure 2 is a transverse section through one of the division, or partition elements; and Figure 3 is a modified form of division element.

1 represents a rectangularly shaped baking pan or other similar receptacle having positioned therein the preferred form of division wall 2. This wall is made of a piece of sheet metal such as tin or the like bent upon itself about a piece of spring wire 3, which extends some distance beyond the ends thereof, the two parts of the wall thus abutting each other continuing for a distance slightly greater than the depth of the pan where the extreme edges thereof are bent outwardly as at 4 at right angles to the central portion, thus forming an inverted T-shaped element. The extreme ends of the wire 3 are bent slightly arcuately in shape but downwardly substantially parallel with the ends of the division wall, with the extreme ends thereof bent upwardly into a circle as at 5 to provide convenient means for engagement by the fingers of an operator in removing the division wall when desired, as the ends of the wire are supposed to snugly engage the walls of the pan and hold them tightly against the ends of the division wall.

The principal object of the lower extremities of the division wall being bent outwardly at right angles is to provide means to prevent the leaking or running of batter or the like of which a cake may be composed from one compartment of the pan to the other, that is to say, if the chef or cook is baking two cakes of different color simultaneously in the pan, there would be no danger of their running together and one discoloring the other.

Furthermore the division wall having these projecting base portions assists materially in removing the cakes from the pan, and, as is obvious, may be slid towards either one side or the other of the pan to divide it as desired, making two equally sized cakes or one narrow and one wide, and two or more division walls may be used in a single pan.

As a modified form of division wall I have shown in Figure 3 the angular bent piece of metal 6 equipped with a wire 7 and turned edge 8 thereupon upon the uppermost edge of the upright portion. In fact a plain piece of sheet metal bent at a right angle may be used in the same manner without the wire forming an exceedingly simple means for dividing a pan and having the element necessary in preventing the uniting of batter on opposite sides of the wall.

Having thus described my invention, what I claim and desire to secure by Letters Patent, is:

A removable division wall for receptacles comprising a piece of sheet metal bent upon itself to form the vertical portion thereof and turned outwardly at right angles to the vertical portion along the line of its base, and a piece of spring wire embedded within the upper extremity of the folded portion, said wire extending beyond the ends of the wall and bent downwardly substantially parallel thereto and sprung inwardly so as to yieldingly engage the side of the receptacle to which the division wall is applied to form holding means for the division wall.

In testimony whereof I hereunto affix my signature in the presence of two witnesses:

HENRIETTA G. SIBBALD.

Witnesses:
    S. C. BRONSON,
    S. GEO. STEVENS.